US012778338B2

(12) United States Patent
Epis

(10) Patent No.: US 12,778,338 B2
(45) Date of Patent: Nov. 3, 2026

(54) MACHINE FOR DISPENSING AN INFUSION BEVERAGE

(71) Applicant: LELIT S.R.L., Castegnato (IT)

(72) Inventor: Mauro Epis, Castegnato (IT)

(73) Assignee: LELIT S.R.L., Castegnato (IT)

( * ) Notice: Subject to any disclaimer, the term of this patent is extended or adjusted under 35 U.S.C. 154(b) by 458 days.

(21) Appl. No.: 18/569,676

(22) PCT Filed: Jul. 6, 2022

(86) PCT No.: PCT/IB2022/056242
§ 371 (c)(1),
(2) Date: Dec. 13, 2023

(87) PCT Pub. No.: WO2023/002284
PCT Pub. Date: Jan. 26, 2023

(65) Prior Publication Data
US 2024/0215754 A1 Jul. 4, 2024

(30) Foreign Application Priority Data
Jul. 23, 2021 (IT) ........................ 102021000019733

(51) Int. Cl.
*A47J 31/46* (2006.01)

(52) U.S. Cl.
CPC ........... *A47J 31/461* (2018.08); *A47J 31/468* (2018.08)

(58) Field of Classification Search
CPC ............................ A47J 31/461; A47J 31/0605
See application file for complete search history.

(56) References Cited

U.S. PATENT DOCUMENTS

| | | | |
|---|---|---|---|
| 7,839,247 | B2 | 11/2010 | Fullerton et al. |
| 8,179,219 | B2 | 5/2012 | Fullerton et al. |
| 8,279,031 | B2 | 10/2012 | Fullerton et al. |

(Continued)

FOREIGN PATENT DOCUMENTS

| | | | |
|---|---|---|---|
| EP | 2991530 | B1 | 10/2017 |
| EP | 3273830 | B1 | 4/2019 |

OTHER PUBLICATIONS

International Search Report for International Patent Application No. PCT/IB2022/056242, mailed Oct. 11, 2022.

*Primary Examiner* — Eric J Kurilla
(74) *Attorney, Agent, or Firm* — CANTOR COLBURN LLP

(57) ABSTRACT

A machine for dispensing an infusion beverage having a pump group, a dispensing group and a flow adjustment solenoid valve is provided. The flow adjustment solenoid valve, fluidly interposed between the pump group and the dispensing group, is suitable for controlling a flow rate of an infusion fluid by use of a shutter, and is configurable in a closing configuration, in which the pump group is inactive and the shutter occludes passage of the infusion fluid, and in a complete opening configuration, in which the pump group is operational and the shutter is fully lifted. Flow adjustment elements regulate the passage of the infusion fluid. Between the closing configuration and the complete opening configuration, the flow adjustment solenoid valve is arranged in an intermediate opening configuration, in which the pump group is operational and the flow adjustment elements allow partial raising of the shutter.

20 Claims, 9 Drawing Sheets

(56) References Cited

U.S. PATENT DOCUMENTS

| | | | | |
|---|---|---|---|---|
| 2011/0132199 | A1* | 6/2011 | Vanni | A47J 31/0621<br>99/295 |
| 2014/0041528 | A1* | 2/2014 | Vanni | F16K 3/085<br>137/487.5 |
| 2018/0255962 | A1* | 9/2018 | Vetterli | A47J 31/52 |
| 2020/0000275 | A1* | 1/2020 | Kelly | F16K 31/0675 |
| 2024/0108161 | A1* | 4/2024 | Fowler | A47J 31/461 |

* cited by examiner

MACHINE FOR DISPENSING AN INFUSION BEVERAGE

CROSS-REFERENCE TO RELATED APPLICATIONS

This application is a National Phase Application of PCT International Application PCT/IB2022/056242, having an International Filing Date of Jul. 6, 2022 which claims priority to Italian Application No. 102021000019733 filed Jul. 23, 2021, each of which is hereby incorporated by reference in its entirety.

FIELD OF THE INVENTION

The present invention relates to a machine for dispensing an infusion beverage, such as coffee, chamomile tea, tea, or herbal tea.

BACKGROUND OF THE INVENTION

In the state of the art, machines for dispensing infusion beverages are equipped with complex systems to regulate the pressure of the infusion fluid.

In particular, most coffee makers are equipped with a dynamic brewing pressure regulation system that consists of three elements, namely, a proportional valve, a control board, and a pressure transducer.

The proportional valve allows the pressure of the infusion fluid to be varied in such a way that an input variation at the valve is directly proportional to the output variation. In other words, the ratio of inlet pressure to outlet pressure is kept constant.

The control board is equipped with a CPU unit integrated on the board itself and enables a closed-loop control over the hydraulic circuit of the infusion fluid.

Finally, the pressure transducer detects the pressure value of the infusion fluid.

The operation of the dynamic brewing pressure regulation system provides for a pump feeding the proportional valve with the infusion fluid. Downstream of the valve, the transducer that detects the pressure value and sends this value to the control board is placed. The control board, depending on the value received from the transducer, changes the pressure of the infusion fluid entering the proportional valve.

The combination of the three elements (valve, transducer, and control board) makes it possible to vary the dispensing pressure quickly and accurately.

Disadvantageously, the dynamic pressure regulation system is expensive, as it requires feedback control.

An additional disadvantage stems from the fact that the system is bulky, because in addition to the valve, the transducer and the control board are also necessary; moreover, the control board also deals with high and low voltage management.

SUMMARY OF THE INVENTION

The object of the present invention is to propose a machine for dispensing an infusion beverage that is able to at least partially solve the drawbacks described above. In particular, it is the object of the present invention to obtain a system for controlling the dispensing pressure that is economical and compact.

Said object is achieved by a machine for dispensing an infusion beverage as described and claimed herein. Preferred embodiments of the present invention are also described.

BRIEF DESCRIPTION OF THE FIGURES

The features and the advantages of the machine for dispensing an infusion beverage according to the invention shall be made readily apparent from the following description of preferred examples of embodiments thereof, provided purely by way of a non-limiting example, with reference to the accompanying figures, wherein.

DETAILED DESCRIPTION

Figure 2:
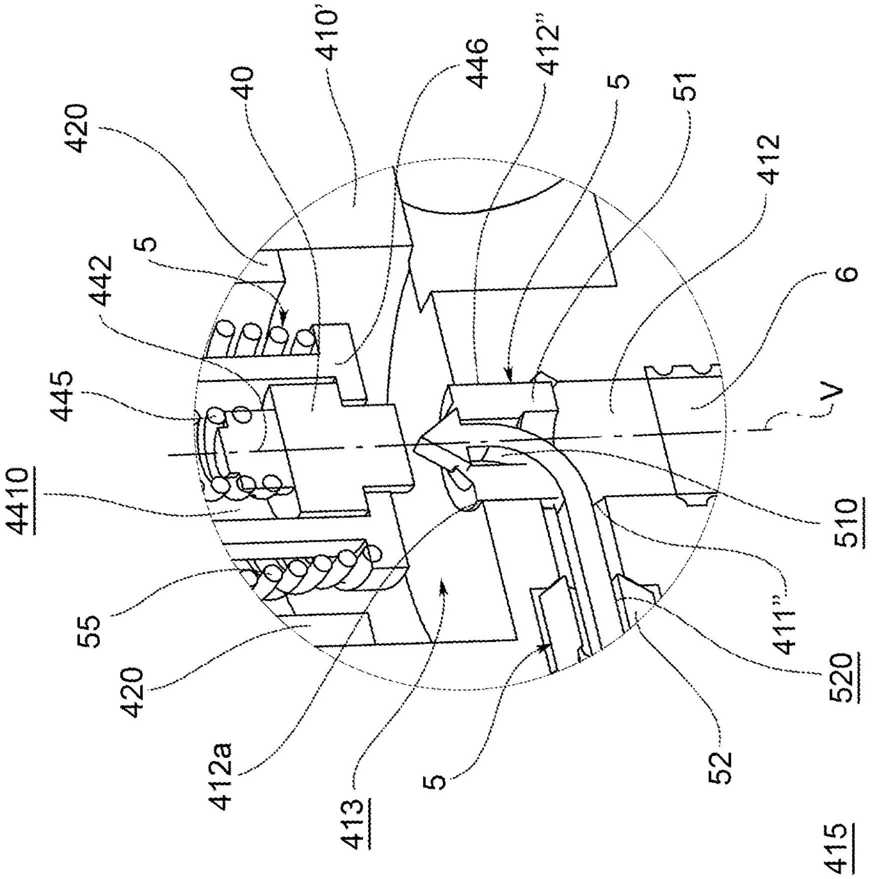
FIG. 2 is a perspective view of the detail II highlighted in FIG. 1.

In the following description, elements common to the various embodiments represented in the drawings are indicated with the same reference numerals.

In said drawings, 1 is used to denote a machine for dispensing an infusion beverage according to the invention as a whole.

In a general embodiment, the machine 1 is suitable for dispensing an infusion beverage, such as coffee, chamomile tea, tea, or herbal tea. Said machine 1 comprises a pump group 2, a dispensing group 3 and a flow adjustment solenoid valve 4.

For example, the pump group 2 is a rotary pump, commonly used in coffee machines, and is suitable for pumping an infusion fluid. For example, the infusion fluid is water, or milk, an alcoholic beverage, or a combination thereof.

The dispensing group 3 is arranged downstream of the pump group 2 and is fluidly connected thereto. Moreover, the dispensing group 3 comprises a filtration member suitable for containing an organic substance wettable by the infusion fluid so as to obtain the corresponding infusion beverage to be dispensed. In particular, the filtration member is a filter holder that comprises within it a filter where the coffee is added.

The flow adjustment solenoid valve 4 extends along a valve axis V and is fluidly interposed between the pump group 2 and the dispensing group 3 so as to control the flow rate of the infusion fluid.

Preferably, the flow adjustment solenoid valve 4 adjusts the pressure and/or speed of the infusion fluid to function as a flow regulator.

The flow adjustment solenoid valve 4 further comprises a shutter 40 movable along the valve axis V.

Said solenoid valve is configurable in a closing configuration, in which the pump group 2 is inactive and the shutter 40 occludes the passage of the infusion fluid from the pump group 2 to the dispensing group 3, and in a complete opening configuration, in which the pump group is operational and the shutter 40 is fully raised so that the infusion fluid may reach the dispensing group.

According to the present invention, the flow adjustment solenoid valve 4 comprises flow adjustment means 5 suitable for regulating the passage of the infusion fluid.

According to one aspect of the invention, between the closing configuration and the complete opening configuration, the flow adjustment solenoid valve 4 is arranged in an intermediate opening configuration, where the pump group 2 is operational and the flow adjustment means 5 allow partial lifting of the shutter 40 so as to partialize the flow rate of the infusion fluid from the pump group to the dispensing group.

Preferably, the flow adjustment means 5 are fully integrated into the flow adjustment solenoid valve 4.

Advantageously, the regulation of the infusion fluid flow rate is only possible by the flow adjustment solenoid valve that regulate the pressure and/or the speed of the infusion fluid. Therefore, the machine is compact, as no additional elements, such as the pressure transducer or the control board, are needed.

Preferably, the flow adjustment means 5 are either fully mechanical or are electronically controlled mechanical means, such as controlled by a computer program. In other words, the flow adjustment means 5 are not fully electronic and are not configured as a closing-loop control.

When the flow adjustment solenoid valve 4 is in the intermediate opening configuration, the machine 1 operates under "low flow" conditions, that is, with low infusion fluid flow rate values. For example, in the intermediate opening configuration, the infusion fluid pressure is in the range of 2 to 7 bar. The intermediate opening configuration is extremely useful during the steps of "blooming," pre-infusion and at the end of dispensing. It is well known to the person skilled in the art that the step of "blooming" or "flowering" is the step in which the organic substance in the filtration member is initially wetted by the infusion fluid. The pre-infusion stage precedes beverage dispensing and is the stage in which the infusion fluid fills the filtration member by wetting the organic matter completely. Finally, during the end stage of brewing, the final extraction from the organic matter occurs, so that the beverage is lengthened.

On the other hand, when the flow adjustment solenoid valve 4 is in the complete opening configuration, the machine 1 operates under "full flow" conditions, i.e., with high flow rate values of the infusion fluid. For example, in the complete opening configuration, the pressure of the infusion fluid is between 8 to 14 bar. It is known to the person skilled in the art that the stage of dispensing the infusion beverage through dispensing group 3 occurs under "full flow" conditions, i.e., when the flow adjustment solenoid valve 4 is in a complete opening configuration.

In one embodiment, the flow adjustment solenoid valve comprises a valve body 41 delimiting an inlet chamber 410, a flow adjustment chamber 413, and an outlet chamber 415.

The inlet chamber 410 is connectable to the pump group 2; in the flow adjustment chamber 413 the shutter 40 is translatable, and the outlet chamber 415 is connectable to dispensing group 3.

Said inlet 410, flow adjustment 413, and outlet 415 chambers are arranged in succession and fluidly connected to each other.

According to one embodiment, the flow adjustment solenoid valve 4 also comprises a tubular element 42, a first core 43, and a piston 44.

The tubular element 42 is engaged to the valve body 41, and the first core 43 is operatively connected to the tubular element 42.

Preferably, the first core 43 is integral to the tubular element 42, e.g., it is connected by welding.

The piston 44 comprises the shutter 40 and extends between a head end 44' and a tail end 44". Said piston 44 is at least partially housed inside the tubular element 42, so that it is guided by the tubular element in the translation between the closing configuration and the complete opening configuration.

Preferably, the valve body 41, the tubular element 42, and the first core 43 delimit a piston translation chamber 414 where the piston 44 is at least partially slidingly housed. Said piston translation chamber 414 faces the flow adjustment chamber 413 and is fluidly connected thereto.

In one embodiment, the piston 44 also comprises a second core 440, a thrust pad 442, a spacer 443 and a second elastic element 445.

The second core 440 internally has a hole 441 that forms, at the head end 44', a shutter chamber 4410 where the shutter is at least partially housed.

The thrust pad 442 is in contact with the shutter 40, whereas the spacer 443 is placed in a seat 444 obtained in the hole 441.

The second elastic element 445 is precompressed and is interposed between the thrust pad 442 and the spacer 443 so as to elastically connect them together, keep the thrust pad 442 abutting against the shutter 40, and keep the spacer 443 in its respective seat 444.

Said thrust pad 442, second elastic element 445 and spacer 443 are housed in axial succession, i.e., along the valve axis V, within the hole 441.

According to one embodiment, the valve body 41 comprises an annular wall 410' that delimits the flow adjustment chamber 413.

Moreover, the tubular element 42 comprises an annular portion 420 that is engaged to the annular wall 410' with shape and/or interference coupling, for example by threaded connection. This annular portion 420 is delimited axially by an abutting undercut 421 that forms a step.

A flange 446 is obtained at the head end 44', which protrudes radially outward.

Flow adjustment means 5 comprise a first elastic element 55 fitted externally on the piston 44, preferably at the head end 44'. Such first elastic element 55 is positioned between the abutting undercut 421 and the flange 446, so that the elasticity of the first elastic element 55 allows the flow adjustment solenoid valve 4 to arrange itself in the intermediate opening configuration.

In particular, in the intermediate opening configuration, the pump group 2 is operational, and the elasticity of the first elastic element 55 allows the partial lifting of the shutter 40 so as to partialize the flow rate of the infusion fluid from the pump group 2 to the dispensing group 3.

Preferably, the tubular element 42 is removably engaged to the valve body 41. For example, in the case of a threaded connection between the tubular element 42 and the valve body 41, it is possible to screw the annular portion 420 into the annular wall 410' so as to reduce the volume of the flow adjustment chamber 413 and increase the pre-compression of the first elastic element 55, or it is possible to unscrew the annular portion 420 from the annular wall 410' so as to disassemble the flow adjustment solenoid valve 4 and replace the first elastic element 55.

According to one embodiment, the first elastic element 55 is a coil spring that operates under loads between 250 and 950 grams.

Preferably, when the flow adjustment solenoid valve 4 is in the closing configuration, the first elastic element 55 is precompressed.

In particular, the elastic constant of the first elastic element 55 is lower than the elastic constant of the second elastic element 445. In other words, the second elastic element 445 is stiffer than the first elastic element 55.

Advantageously, the first elastic element is easily replaceable in case its stiffness needs to be increased or reduced or in case of breakage. In addition, due to the ease with which the flow adjustment solenoid valve may be disassembled, an operator may easily separate the tubular element from the valve body and replace the first elastic element.

Figure 3:
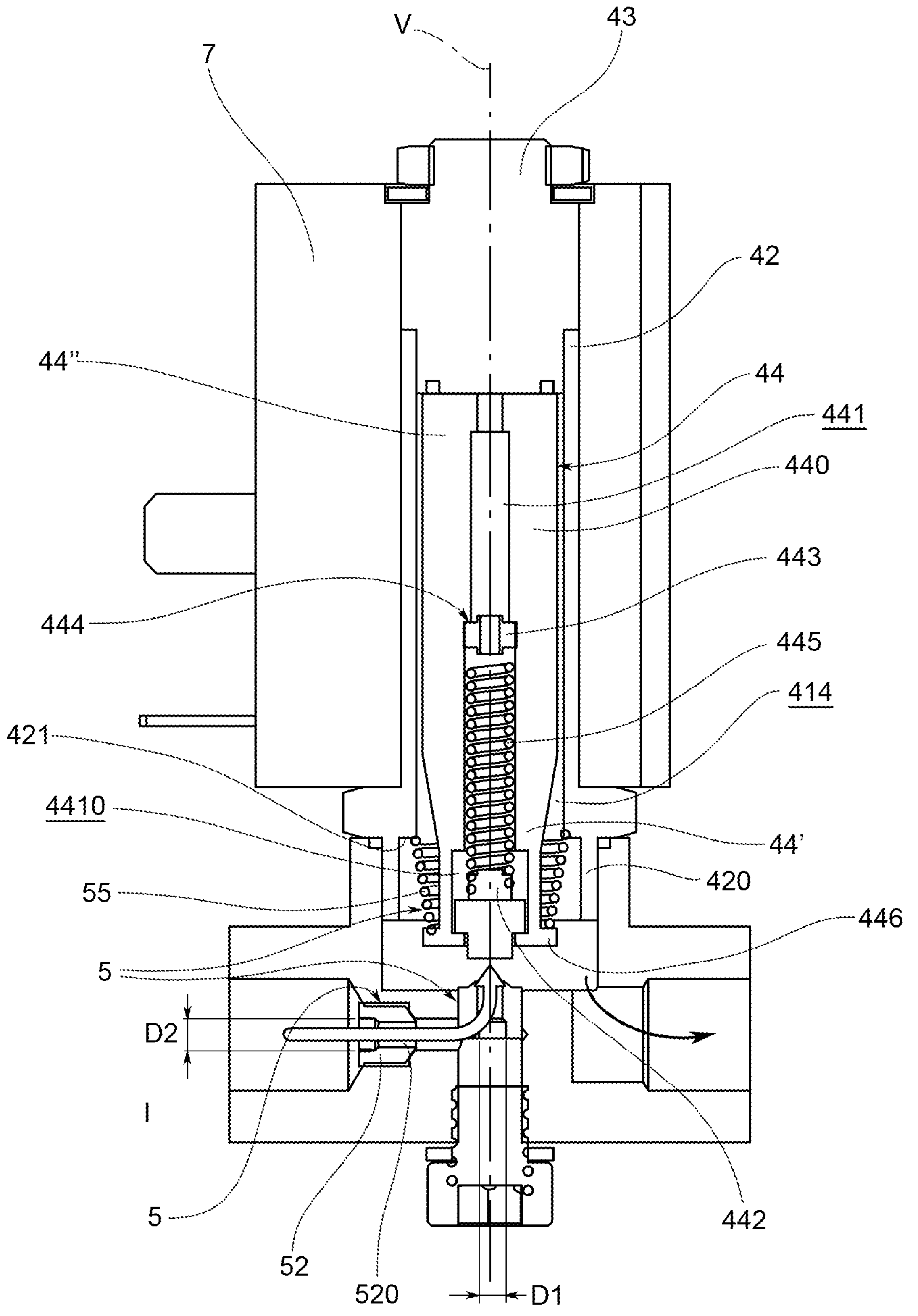
FIG. 3 is a front view of the flow adjustment solenoid valve in FIG. 1 in a complete opening configuration.
Figure 3B:
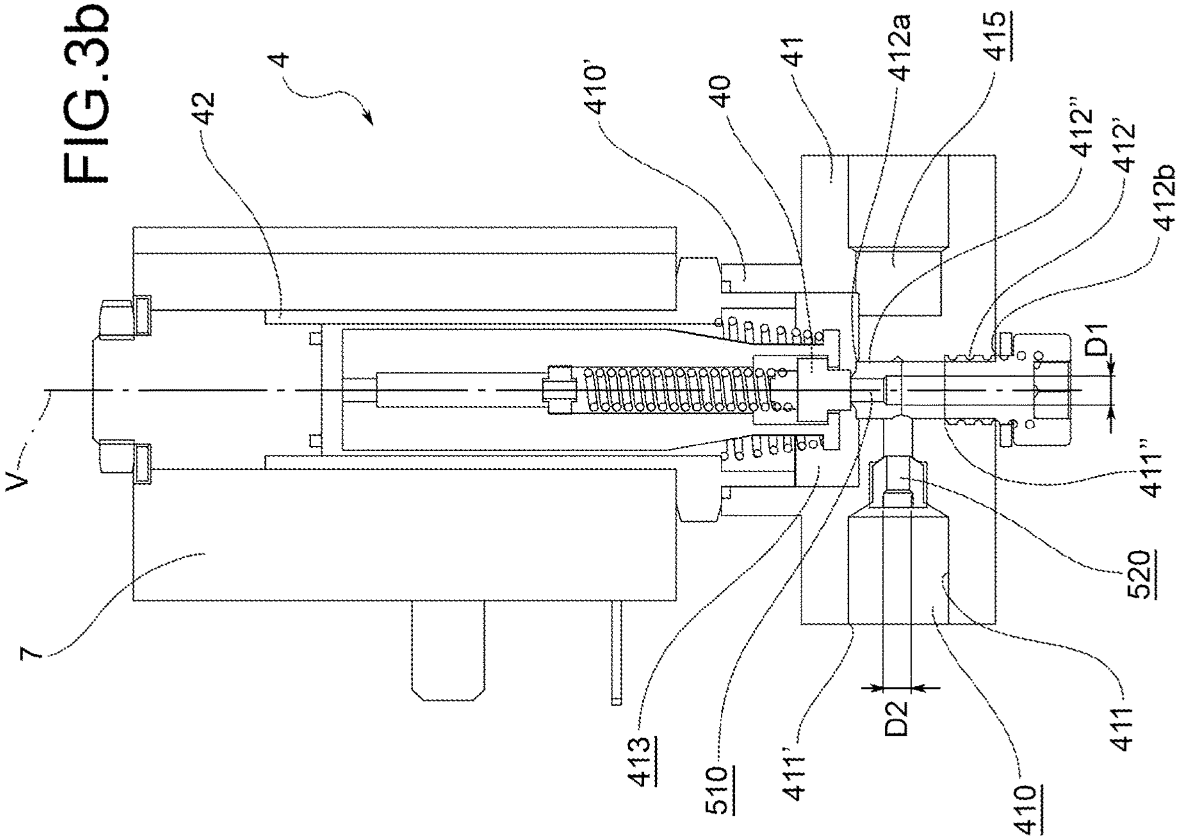
FIG. 3*b* is a front view of the flow adjustment solenoid valve in FIG. 1 in a closing configuration.
Figure 3A:
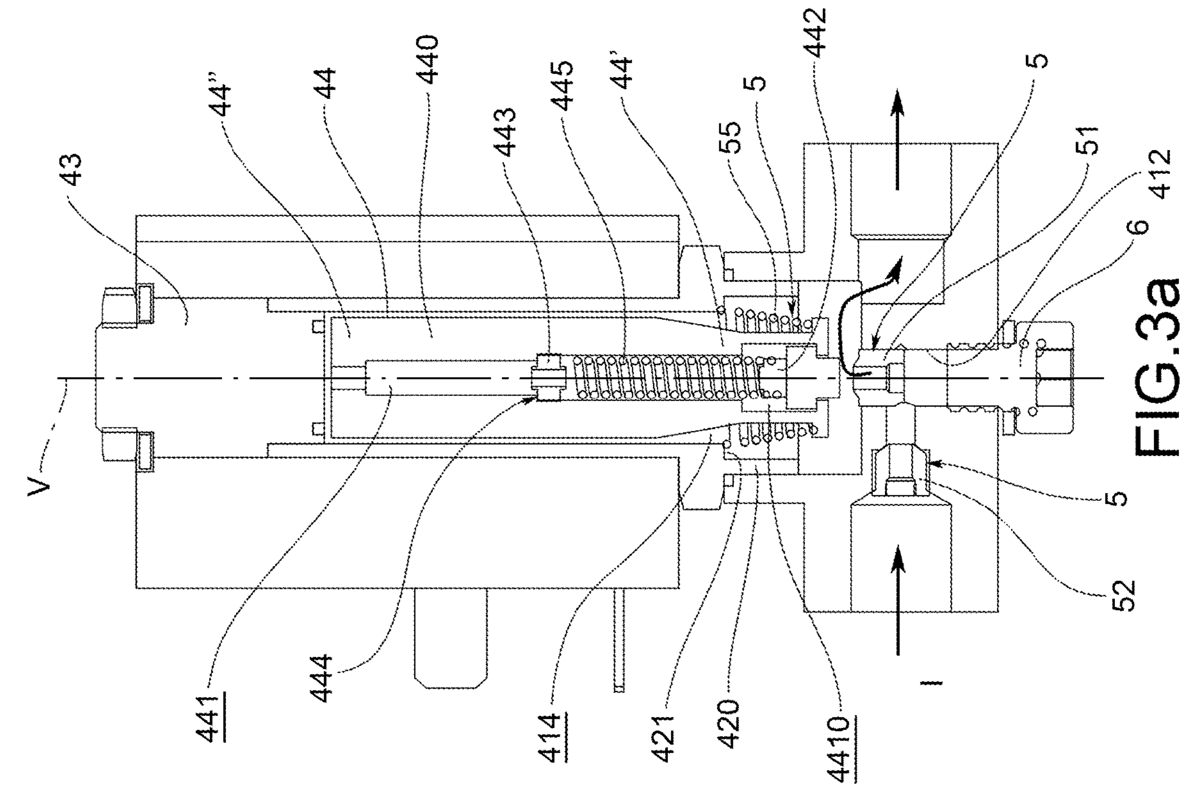
FIG. 3*a* is a front view of the flow adjustment solenoid valve in FIG. 1 in an intermediate opening configuration.

According to one embodiment shown in the attached FIG. 3-3*b*, the flow adjustment means 5 also comprise a first insert 51 that is removably engageable within the inlet chamber 410. The insert has a first through-hole 510 for the passage of the infusion fluid.

This first through-hole 510 is occluded by the shutter 40 in the closing configuration and is defined by a first hole diameter D1 suitable for allowing the flow of the infusion fluid to lift the shutter and move it from the closing configuration to the intermediate opening configuration.

In other words, through the length of the first hole diameter, it is possible to obtain the desired pressure and velocity values of the infusion fluid, so that the obtained flow is able to lift the shutter and arrange the flow adjustment solenoid valve in the intermediate opening configuration.

According to one embodiment, the inlet chamber 410 comprises an access opening 412*b* facing outwards from the valve body 41 and suitable for allowing the adjustment of the axial position of the first insert 51 along the inlet chamber 410 and/or the replacement of the first insert 51 without disassembling the flow adjustment solenoid valve 4.

Advantageously, the first insert may be accessed through the access opening so that its position along the valve axis may be regulated. By moving the first insert toward the shutter, the pre-compression of the first elastic element may be increased. Conversely, moving the first insert axially away from the shutter reduces the pre-compression of the first elastic element in the closing configuration. In particular, by controlling the pre-compression of the first elastic element, a micro-adjustment of the flow of the infusion fluid may be achieved, as increasing the pre-compression results in greater resistance to the passage of the infusion fluid, which leads to a change in the pressure and velocity of the infusion fluid.

In the present case, moving the first insert toward the shutter and thus increasing the pre-compression of the first elastic element increases the resistance to the passage of the infusion fluid and decreases the fluid pressure, for example, the pressure is less than 4 bar. Conversely, moving the first insert away from the shutter and thus reducing the pre-compression of the first elastic element decreases the resistance to the passage of the infusion fluid and increases the fluid pressure, e.g., the pressure is above 4 bar.

Figure 4:
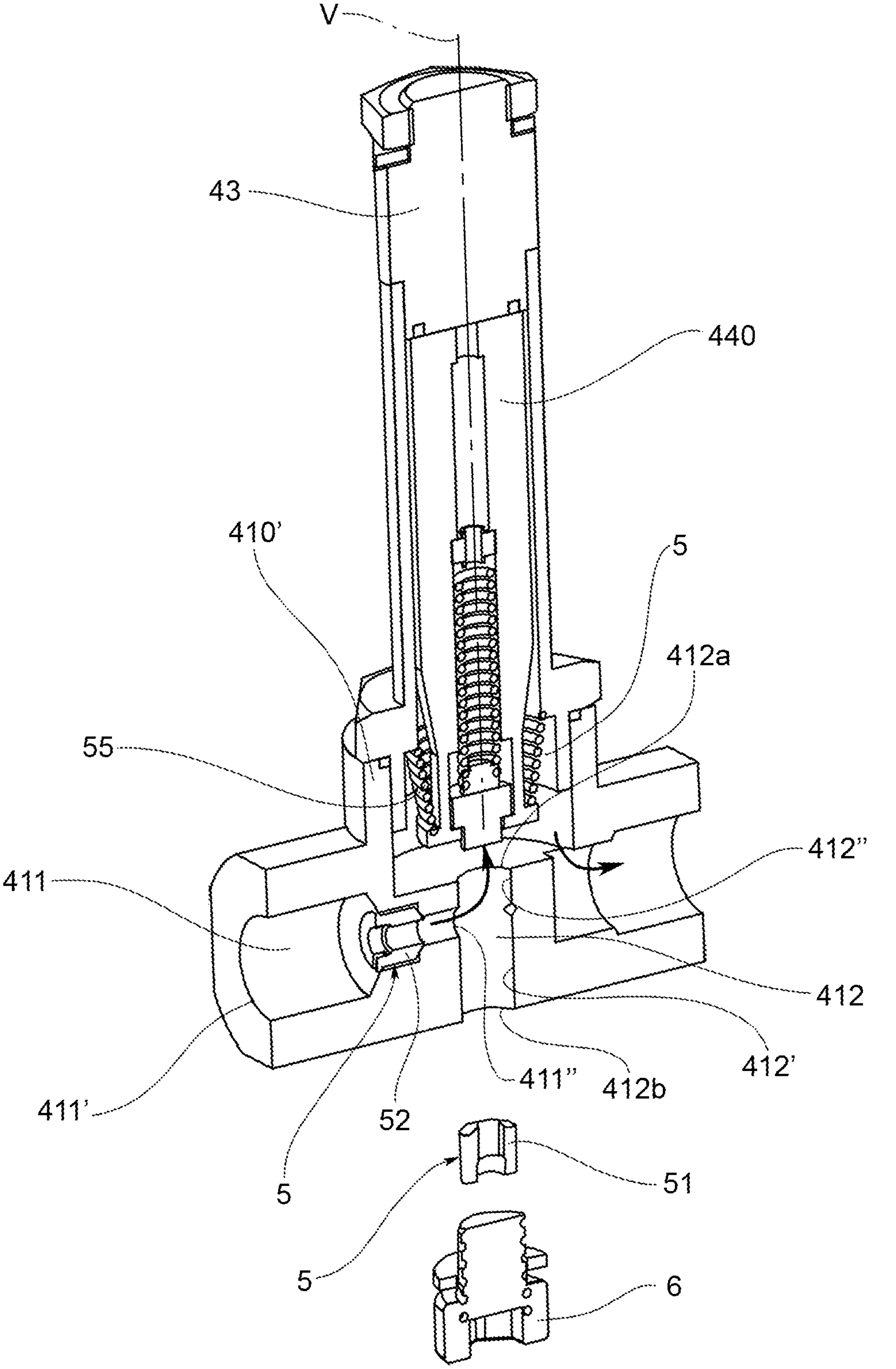
FIG. 4 is a perspective view in separate components of the flow adjustment solenoid valve in FIG. 1.

As also shown in FIG. 4, the access opening also allows the first insert to be replaced in the case of breakage or if a first insert with a different length of the first hole diameter is desired.

Advantageously, by choosing the first insert with the desired length of the first hole diameter, it is possible to obtain certain pressure and speed values of the infusion fluid, so that the obtained flow is able to lift the shutter and arrange the flow adjustment solenoid valve in the intermediate opening configuration.

In other words, by appropriately choosing the first insert, a flow macro-adjustment may be achieved, because through the length of the first hole diameter, the desired pressure and speed values of the infusion fluid may be obtained.

Figure 1:
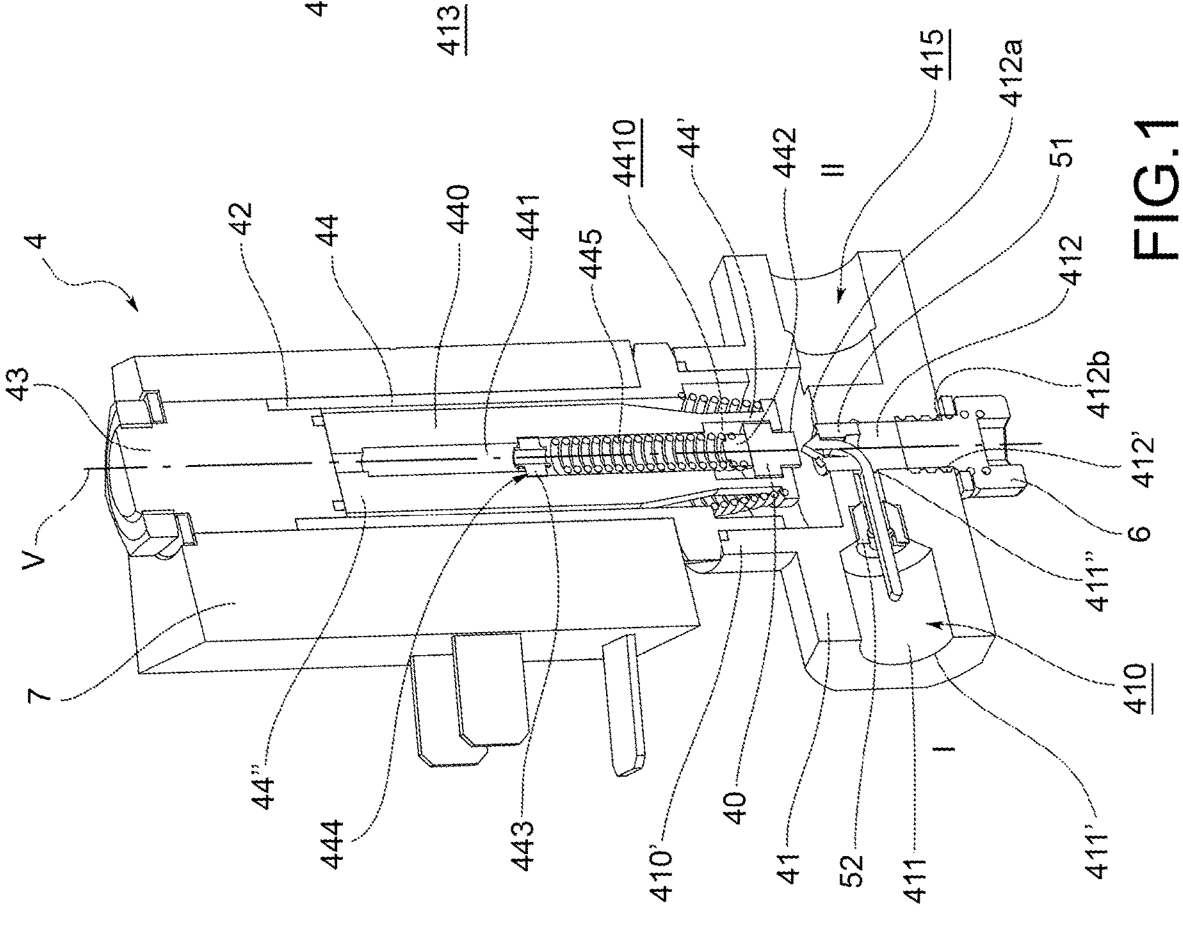
FIG. 1 is a perspective sectional view of a flow adjustment solenoid valve in one embodiment.

According to an example embodiment shown in FIG. 1, the flow adjustment solenoid valve 4 comprises a cap 6 to removably close the access opening 412*b*.

By removing the cap 6, it is possible to access the first insert 51 and regulate its axial position (flow micro-adjustment) or replace it (flow macro-adjustment).

In one embodiment, the inlet chamber 410 is defined by a first pipe 411 extending along a fluid inlet axis I, and a second pipe 412 extending along the valve axis V.

The valve axis V is incident to the fluid inlet axis I. Preferably, the valve axis V is orthogonal to the fluid inlet axis I so as to form an inlet chamber 410 substantially in the shape of a T (FIG. 4) or L (FIG. 6*a*).

The first pipe 411 has an inlet mouth 411' suitable for receiving the infusion fluid pumped by the pump group 2, and a connection mouth 411" for connection with the second pipe 412.

The second pipe 412 extends between a first end 412' and a second end 412" opposite the first, where that second end 412" has an opening 412*a* facing the flow adjustment chamber 413 and suitable for being occluded by the shutter 40 in the closing configuration.

Preferably, the connection mouth 411" flows into an intermediate portion of the second pipe 412, i.e., between the first 412' and the second end 412". Alternatively, the connection mouth 411" opens at the first end 412' (FIG. 6*a*).

According to one embodiment, the access opening 412*b* delimits axially the first end 412', and, at the second end 412", the first insert 51 is placed. In particular, the first insert 51 is placed at the opening 412*a*.

In one embodiment, the flow adjustment means 5 also comprise a second insert 52 removably engageable inside the inlet chamber 410 so that it may be replaced without disassembling the flow adjustment solenoid valve 4. Preferably, the second insert 52 is arranged inside the first pipe 411 in the vicinity of the connection mouth 411".

Said second insert 52 has a second through-hole 520 for the passage of the infusion fluid, and said second through-hole 520 is defined by a diameter D2 that allows the regulation of the pressure and speed of the infusion fluid.

In detail, the first pipe 411 exhibits at least one taper proceeding axially along the fluid inlet axis I from the inlet mouth 411' to the connection mouth 411". Such taper defines a second seat in which to house the second insert 52, for example, by shape and/or force coupling, or by threaded connection.

Figure 5:
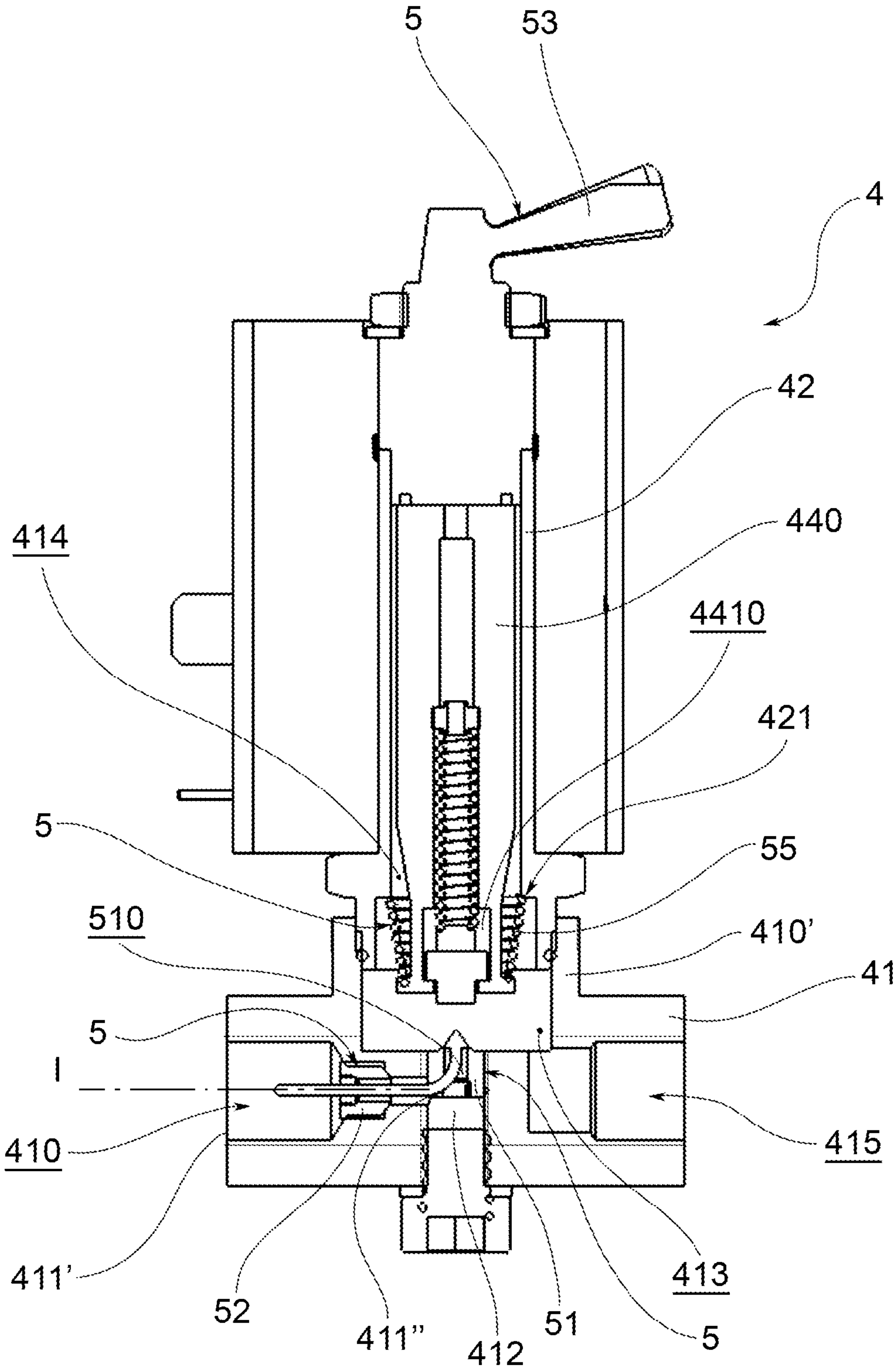
FIG. 5 is a front view of a further embodiment of the flow adjustment solenoid valve in a complete opening configuration.

According to an embodiment illustrated in FIG. 5, the flow adjustment means 5 also comprise an upper flow adjustment member 53, such as a lever or a handle, integral to the first core 43. By actuating the upper flow adjustment member 53, the first core 43 moves along the valve axis V and moves the tubular element 42, so that the annular portion 420 of the tubular element 42 engages the annular wall 410' of the valve body 41 more deeply, causing an increase in the pre-compression of the first elastic element 55.

For example, by rotating the handle, the rotation is transferred from the first core 43 to the tubular element 42, the annular portion 420 of which screws deeper into the annular wall 410' of the valve body 41.

Advantageously, screwing the annular portion into the annular wall reduces the volume of the flow adjustment chamber and increases the pre-compression of the first elastic element. Said pre-compression defines the force with which the shutter occludes the infusion fluid passage and enables a micro-adjustment of the flow, because it allows the pressure and speed of the infusion fluid to be adjusted when the flow adjustment solenoid valve is in the intermediate opening configuration.

Figure 6:
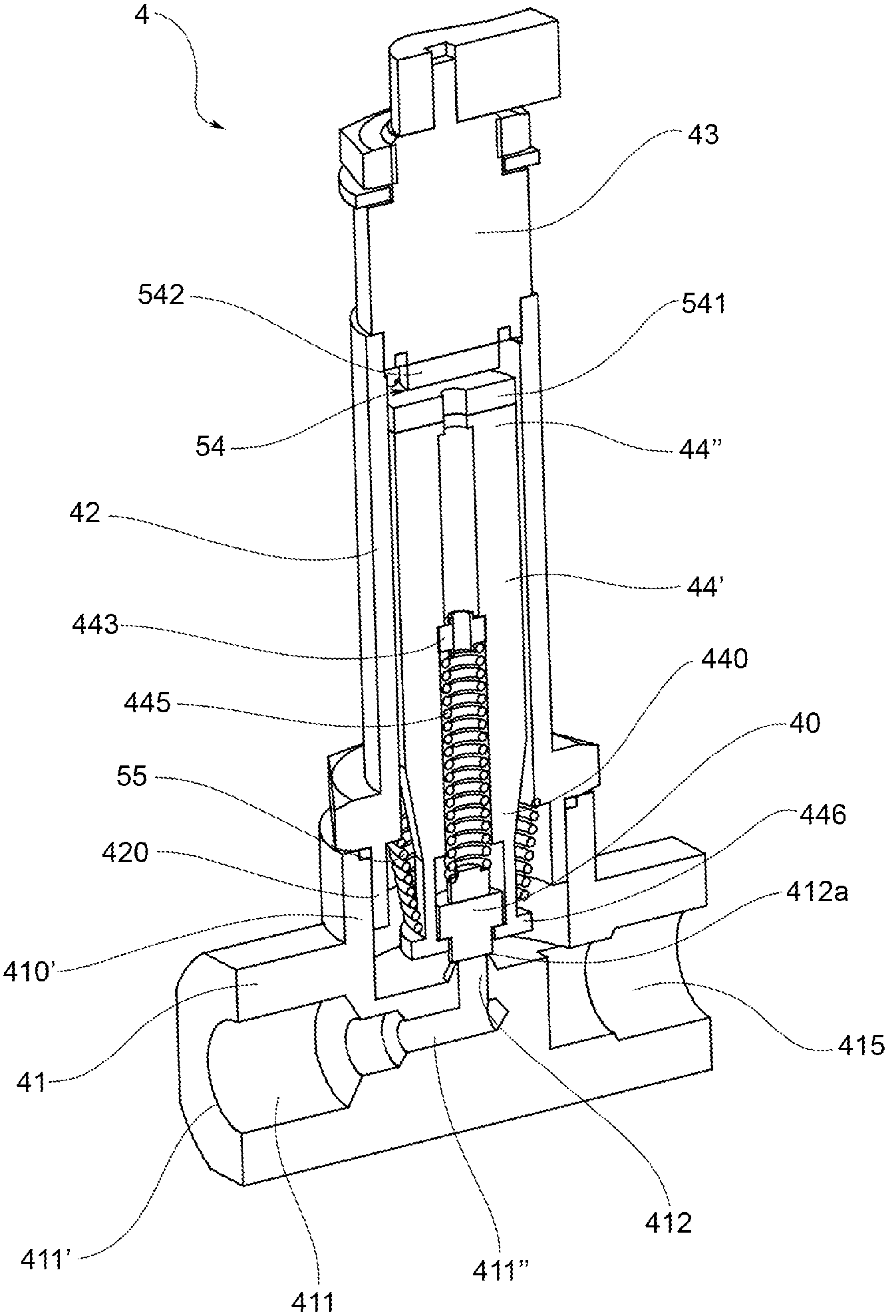
FIG. 6 is a perspective view of an even further embodiment of the flow adjustment solenoid valve in a closing configuration.
Figure 6A:
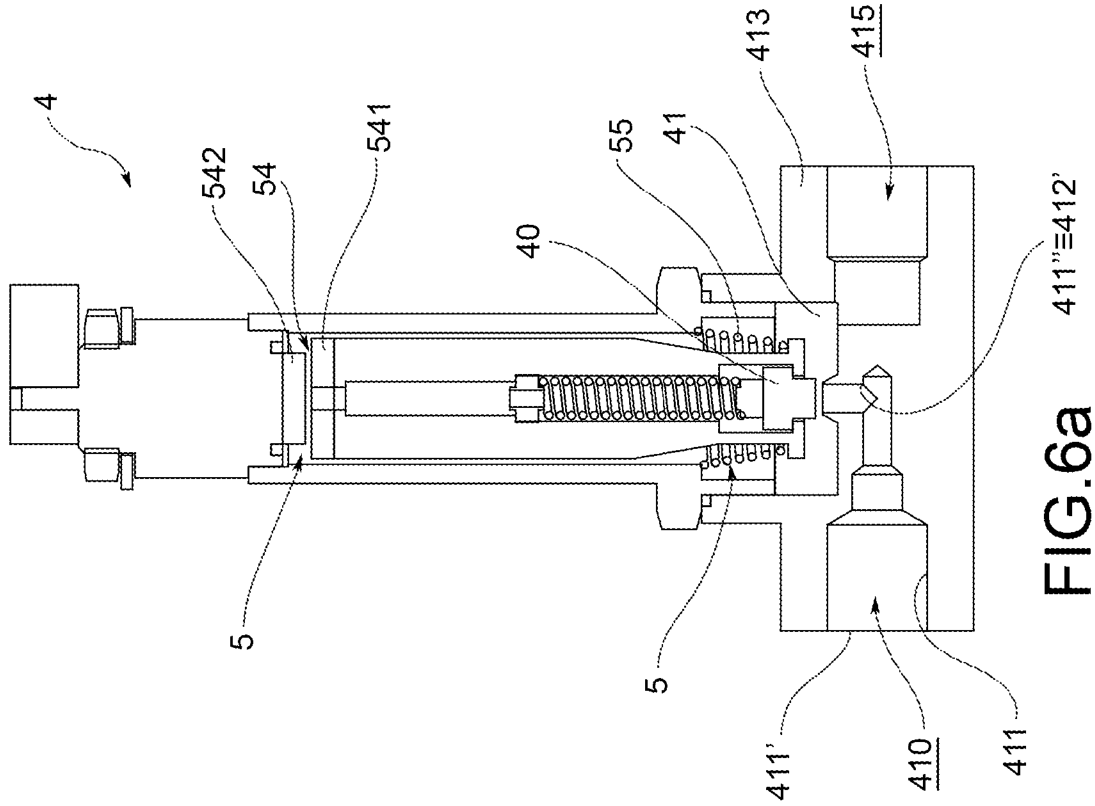
FIG. 6*a* is a front view of the flow adjustment solenoid valve in FIG. 6 in an intermediate opening configuration.
Figure 6B:
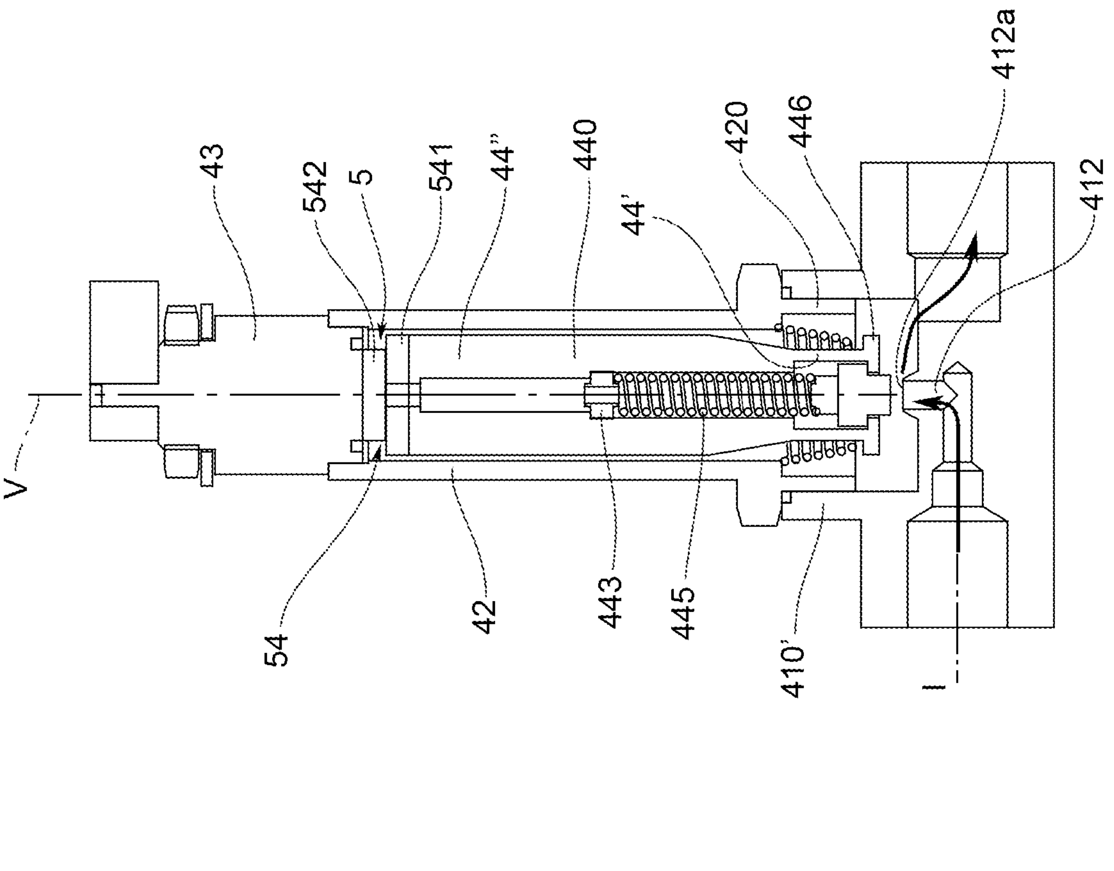
FIG. 6*b* is a front view of the flow adjustment solenoid valve in FIG. 6 in a closing configuration.
Figure 7:
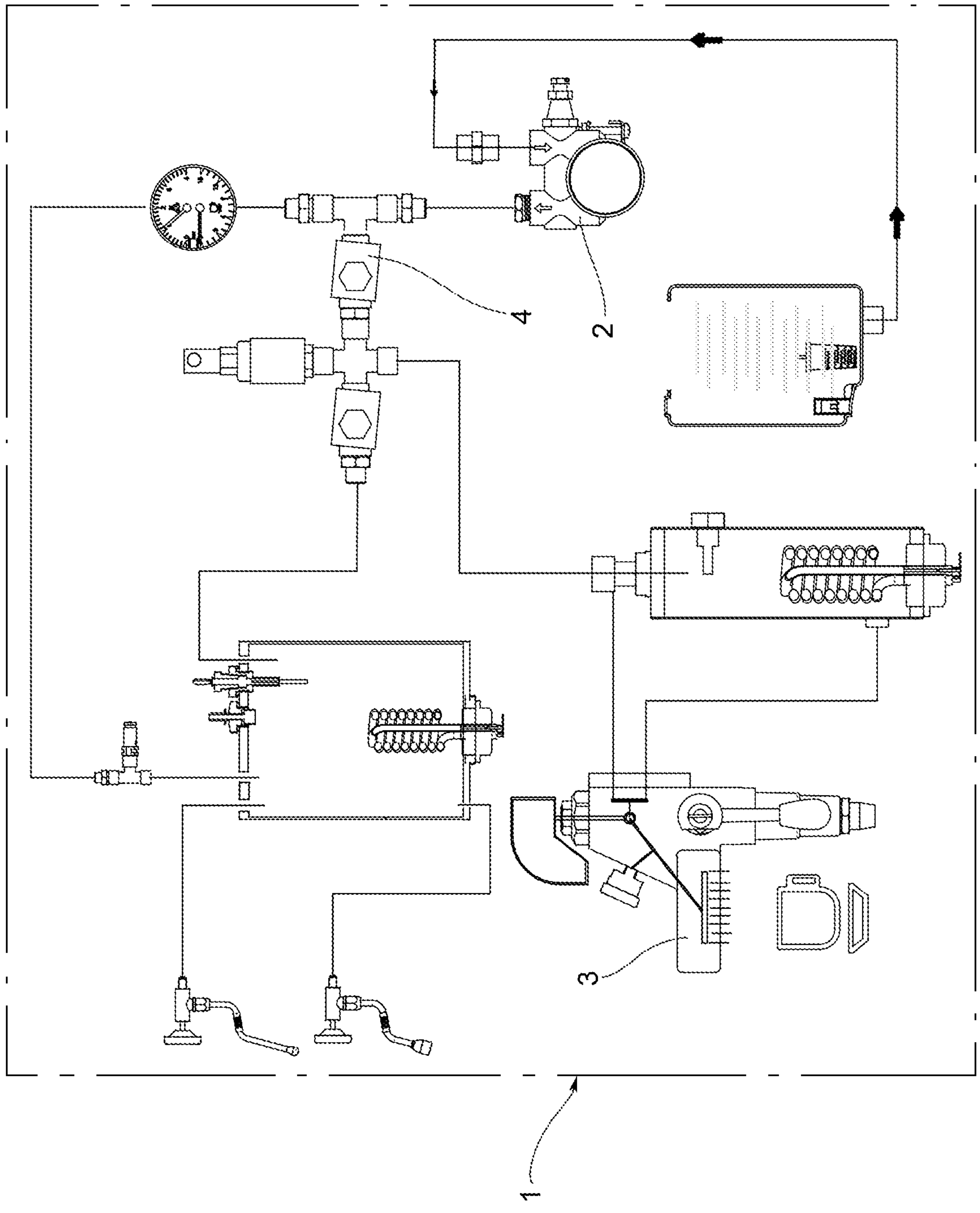
FIG. 7 is a diagram of a machine for dispensing an infusion beverage.

According to one embodiment illustrated in the attached FIG. 6-6*b*, the flow adjustment means 5 comprise a pair of programmable magnets 54, where a first magnet 541 of said pair of programmable magnets 54 is fixed to the tail end 44", and a second magnet 542 of said pair of programmable magnets 54 is fixed and made integral to the first core 43 so as to be facing the first magnet 541. The flow adjustment solenoid valve 4 is powered by an electric motor that controls the rotation about the valve axis V of the first core 43.

The rotation of the first core 43 is then transferred to the second magnet 542, which rotates by a predefined first angle, so as s to achieve angular alignment along the valve axis V between the first 541 and the second magnet 542. Said angular alignment along the valve axis V allows the pair of programmable magnets 54 to behave like a spring and thus allows the flow adjustment solenoid valve 4 to arrange itself in intermediate opening configuration.

For the purpose of this discussion, the term "programmable magnet" or "correlated magnet," or even simply "polymagnet" refers to a magnetic structure comprising a plurality of magnets of alternating polarity and variously arranged on a plane. By virtue of said plurality of magnets, extremely complex magnetic fields may be generated, and bringing a pair of programmable magnets closer together may result in different behaviors depending on how the polarities of the magnets that make up each programmable magnet are arranged.

In particular, programmable magnets have been the subject of a plurality of patents filed under the name "Correlated Magnetics Research," including US7839247B2, 8,179,219B2 and 8,279,031B2.

In the present case, considering a pair of programmable magnets facing each other and rotating the first magnet with respect to the second magnet, i.e., changing the axial angular alignment between the two magnets, three different responses may occur: attraction, rejecting and "spring" behavior.

In "spring" behavior, the two magnets stand at an equilibrium distance, and bringing them closer together it generates rejecting forces that tend to bring them back to the equilibrium distance. On the contrary, moving them away from each other creates attractive forces that tend to bring them back to the equilibrium distance.

In the embodiment shown in FIG. 6*a*, the first 541 and second 542 magnets are observed at the equilibrium distance, i.e., angularly aligned along the valve axis V so as to exhibit "spring" behavior.

Advantageously, through the planar arrangement of the plurality of magnets with alternating polarity that makes up each programmable magnet, it is possible to choose the pair of programmable magnets that exhibits the desired equilibrium distance. Specifically, at the equilibrium distance, the flow adjustment solenoid valve is arranged in the intermediate opening configuration, and by choosing the appropriate equilibrium distance, the desired flow of infusion fluid may be achieved.

According to an embodiment shown in FIG. 6*b*, the second magnet 542 rotates by a second predefined angle so as to achieve an angular alignment along the valve axis V between the first 541 and the second 542 magnet such that the pair of programmable magnets 54 may attract each other and arrange the flow adjustment solenoid valve 4 in a complete opening configuration. In other words, when the second magnet 542 rotates by an amplitude equal to that of the second predefined angle, the axial angular alignment of the pair of programmable magnets results in an attraction behavior between the first and second magnets.

In the embodiment shown in FIG. 6, the second magnet 542 rotates by a predefined third angle so as to obtain an angular alignment along the valve axis V between the first 541 and the second 542 magnet such that the pair of programmable magnets 54 may repel each other and arrange the flow adjustment solenoid valve 4 into a closing configuration. In other words, when the second magnet 542 rotates by an amplitude equal to that of the predefined third angle, the axial angular alignment of the pair of programmable magnets results in rejecting behavior between the first and second magnets.

Specifically, the flow adjustment means 5 comprise the first elastic element 55 and/or the first insert 51 and/or the second insert 52 and/or the upper flow adjustment member 53 and/or the pair of programmable magnets 54. The flow adjustment means 5 are suitable for regulating the flow of infusion fluid from the pump group 2 to the dispensing group 3 when the flow adjustment solenoid valve 4 is in the intermediate opening configuration.

Preferably, the flow adjustment solenoid valve 4 also comprises a coil 7 that, when current flows through it, generates a magnetic field that lifts the piston 44 due to the presence of the second core 440 that is made of a ferrous material. By lifting the piston 44, the flow adjustment solenoid valve 4 is arranged in the complete opening configuration.

Figure 8A:
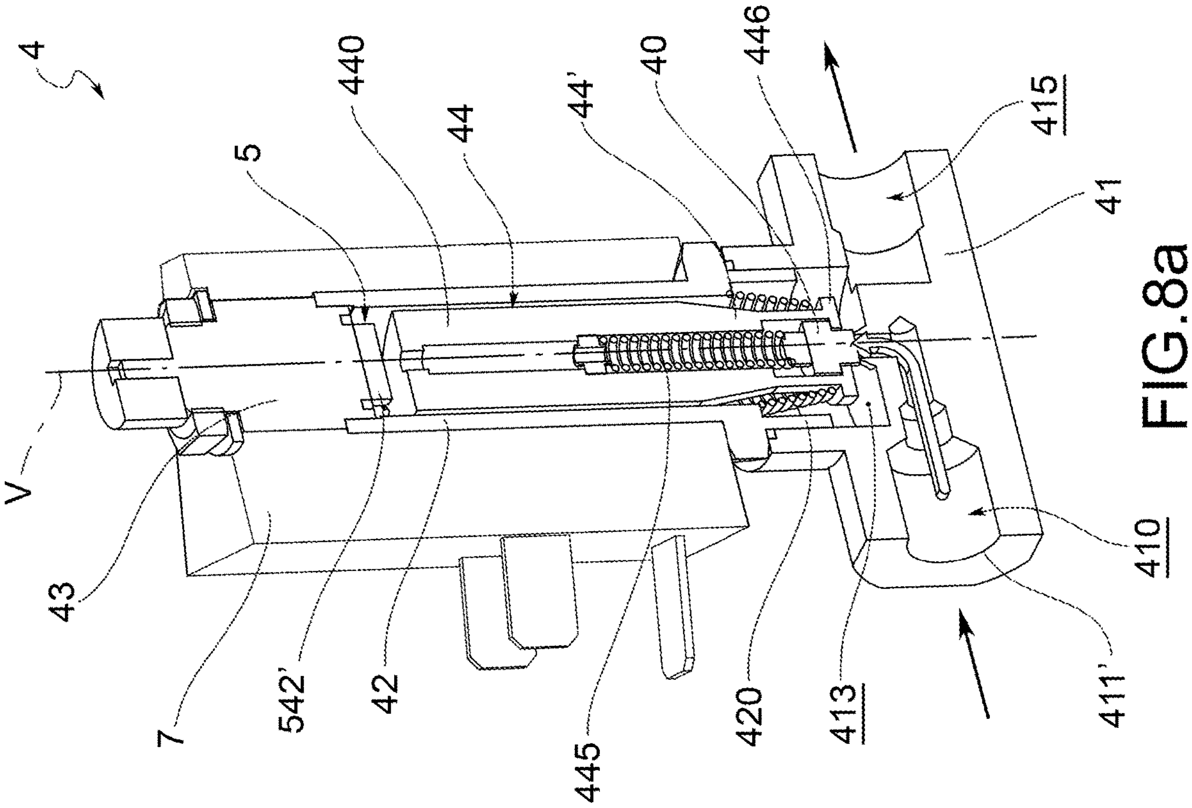
FIG. 8*a* is a perspective view of the embodiment in FIG. 8.
Figure 8:
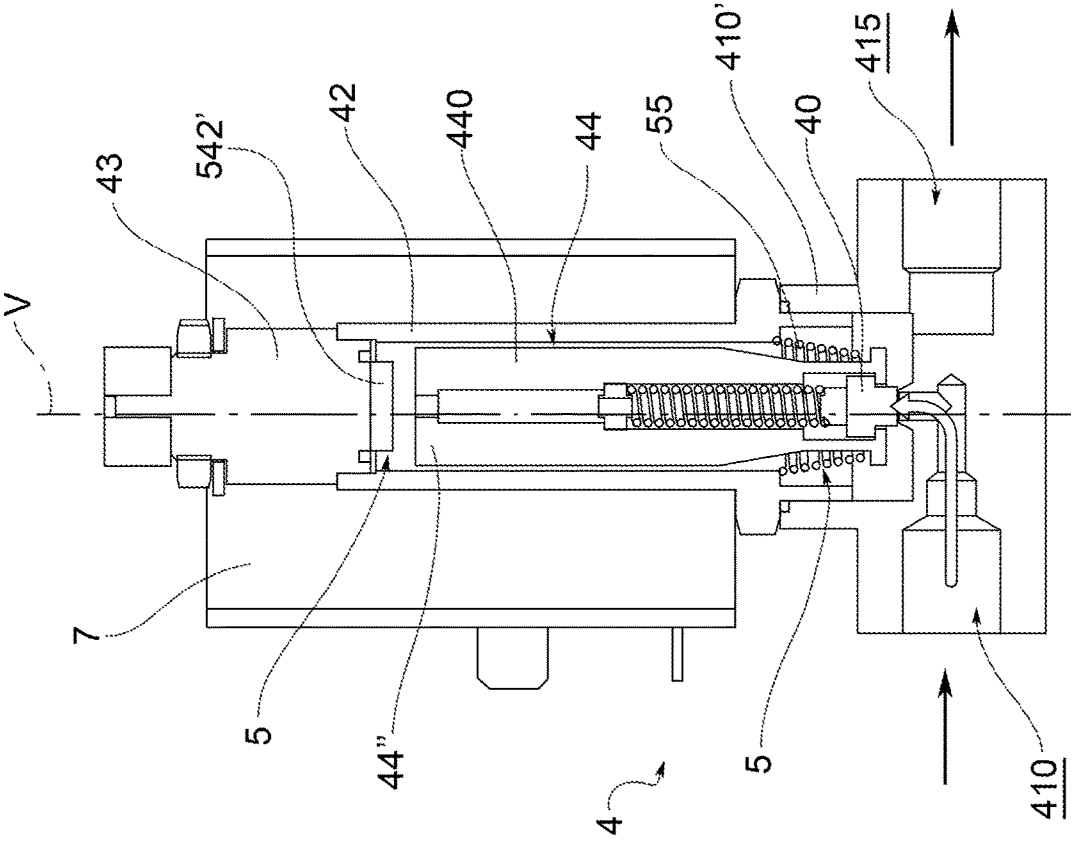
FIG. 8 is a front view of a different embodiment of the flow adjustment solenoid valve in a closing configuration.

According to a different embodiment shown in the attached FIG. 8, the piston 44 is at least partially a permanent magnet and the flow adjustment means 5 also comprise a permanent micro-adjustment magnet 542' that is fixed and made integral to the first core 43. Said permanent micro-adjustment magnet 542' is facing the piston 44, such that the facing polarities of the permanent micro-adjustment magnet 542' and of the piston 44 are coincident.

Since the polarity of the permanent micro-adjustment magnet 542' is facing and coincident with the polarity of the piston 44, a rejecting force is generated on the piston 44, which, as it moves away from the first core 43, results in an increase of the force with which the shutter 40 occludes the passage of the infusion fluid.

With the flow adjustment solenoid valve 4 in the intermediate opening configuration, the higher the rejecting force the lower the infusion fluid flow rate. In fact, considering that the pressure of the infusion fluid determines the lifting of the shutter, the higher the rejecting force, the less the shutter 40 may be lifted; conversely, the lower the rejecting force, the more the shutter 40 may be lifted.

To reduce the rejecting force, the first core 43 may be moved along the valve axis V, so that the permanent micro-adjustment magnet 542' is moved away from the piston 44.

Advantageously, by adjusting the rejecting force between the permanent micro-adjustment magnet 542' and the piston 44, a micro-adjustment of the flow of the infusion fluid may be achieved. Specifically, increasing the rejecting force results in greater resistance to the passage of the infusion fluid, which leads to a change in the pressure and the velocity of the infusion fluid. Conversely, reducing the rejecting force also the resistance to the passage of the infusion fluid decreases.

It will appear obvious to the person skilled in the art that, in order to arrange the flow adjustment solenoid valve 4 in the complete opening configuration, the current must flow through the coil 7 so as to generate a magnetic field so as to overcome the rejecting force and lift the piston 44.

Preferably, the piston 44 comprises the second core 440 which is a permanent magnet.

According to the attached figures, the directional arrows shown indicate the flow direction of the infusion fluid.

Innovatively, the infusion beverage dispensing machine achieves the intended object, as it allows the dispensing pressure to be controlled by the flow adjustment solenoid valve alone.

Advantageously, the machine that is the subject of the present invention is extremely versatile, because in addition to the flow adjustment solenoid valve, the pressure and/or speed of the infusion fluid may also be regulated through the pump group. In other words, the synergic combination of the pump group with the flow adjustment solenoid valve allows the pressure of the infusion fluid to be varied while dispensing the infusion beverage.

According to an advantageous aspect, the machine that is the subject of the present invention is compact because the flow adjustment means are fully integrated into the flow adjustment solenoid valve. In other words, the control board and pressure transducer are not necessary to carry out the adjustment of the dispensing pressure.

According to an even further advantageous aspect, the machine that is the subject of the present invention allows operation under both “low flow” and “full flow” conditions, i.e., it allows adjustment of the flow rate of the infusion fluid during each phase of infusion of the organic substance (e.g., blooming, pre-infusion, dispensing, end of dispensing).

To the embodiments of the machine for dispensing an infusion beverage according to the present invention, a person skilled in the art, in order to meet contingent needs, may make changes, adaptations, and replacements of elements with others that are functionally equivalent without departing from the scope of protection of the following claims. Each of the features described as belonging to a possible embodiment may be obtained independently of the other described embodiments.

The invention claimed is:

1. A machine for dispensing an infusion beverage, comprising:

a pump group suitable for pumping an infusion fluid;

a dispensing group arranged downstream of the pump group and fluidly connected to the pump group, said dispensing group comprising a filtration member suitable for containing an organic substance wettable by the infusion fluid so as to obtain the infusion beverage to be dispensed;

a flow adjustment solenoid valve extending along a valve axis and fluidly interposed between the pump group and the dispensing group to control a flow of the infusion fluid, said flow adjustment solenoid valve comprising a shutter movable along the valve axis and configurable in a closing configuration, in which the pump group is inactive and the shutter blocks a passage of the infusion fluid from the pump group to the dispensing group, and in a complete opening configuration, in which the pump group operates and the shutter is completely lifted to allow the infusion fluid to reach the dispensing group, wherein the flow adjustment solenoid valve comprises flow adjustment means suitable for adjusting the passage of the infusion fluid, and wherein, between the closing configuration and the complete opening configuration, the flow adjustment solenoid valve is arranged in an intermediate opening configuration, in which the pump group operates and the flow adjustment means allow a partial lifting of the shutter to partialize the flow of the infusion fluid from the pump group to the dispensing group.

2. The machine of claim 1, wherein the infusion beverage is coffee, chamomile, tea, or herbal tea.

3. The machine of claim 1, wherein the pump group is a rotary pump.

4. The machine of claim 1, wherein the flow adjustment solenoid valve comprises a valve body delimiting an inlet chamber connectable to the pump group, a flow adjustment chamber in which the shutter is translatable, and an outlet chamber connectable to the dispensing group, said inlet chamber, flow adjustment chamber, and outlet chamber being arranged in a fluid sequence.

5. The machine of claim 4, wherein the flow adjustment solenoid valve further comprises:

a tubular element engaged with the valve body;

a first core operatively connected to the tubular element; and a piston comprising the shutter and extending between a head end and a tail end, said piston being at least partially housed inside the tubular element, so as to be guided by the tubular element in translation between the closing configuration and the complete opening configuration.

6. The machine of claim 5, wherein:

the valve body comprises an annular wall delimiting the flow adjustment chamber;

the tubular element comprises an annular portion engaged with the annular wall by shape and/or interference coupling, said annular portion being axially delimited by an abutting undercut forming a step; and a flange protruding radially outwards is formed at the head end, and wherein the flow adjustment means comprise a first elastic element externally fitted onto the piston and positioned between the abutting undercut and the flange, so that resilience of the first elastic element allows the flow adjustment solenoid valve to be arranged in the intermediate opening configuration.

7. The machine of claim 6, wherein the first elastic element is a coil spring acting with loads between 250 and 950 g.

8. The machine of claim 6, wherein the flow adjustment means further comprise an upper flow adjustment member, the upper flow adjustment member optionally being a lever or a handle, integral with the first core so that, by operating the upper flow adjustment member, the first core moves along the valve axis and moves the tubular element, and the annular portion of the tubular element engages the annular wall of the valve body more deeply, causing an increase in a pre-compression of the first elastic element.

9. The machine of claim 5, wherein the flow adjustment means comprise a pair of programmable magnets, and wherein a first magnet of said pair of programmable magnets is fixed to the tail end, and a second magnet of said pair of programmable magnets is fixed to and made integral with the first core so as to face the first magnet, the flow adjustment solenoid valve being powered by an electric motor controlling a rotation about the valve axis of the first core, the rotation of the first core being transferred to the second magnet, which rotates by a first predetermined angle, so as to obtain an angular alignment along the valve axis between the first and second magnets such as to allow the pair of programmable magnets to behave as a spring and therefore-allow the flow adjustment solenoid valve to be arranged in the intermediate opening configuration.

10. The machine of claim 9, wherein the second magnet rotates by a second predetermined angle, so as to obtain an angular alignment along the valve axis between the first and second magnets to allow the pair of programmable magnets to attract each other and arrange the flow adjustment solenoid valve in the complete opening configuration.

11. The machine of claim 10, wherein the second magnet rotates by a third predetermined angle, so as to obtain an angular alignment along the valve axis between the first and second magnets to allow the pair of programmable magnets to repel each other and arrange the flow adjustment solenoid valve in the closing configuration.

12. The machine of claim 3, wherein the piston is at least partially a permanent magnet and wherein the flow adjustment means comprise a permanent micro-adjustment magnet fixed to and made integral with the first core, said permanent micro-adjustment magnet facing the piston so that a polarity of the permanent micro-adjustment magnet faces and coincides with a polarity of the piston to generate a rejecting force on the piston, wherein said piston, moving away from the first core due to the rejecting force, results in an increase in a force with which the shutter blocks the passage of the infusion fluid.

13. The machine of claim 4, wherein the flow adjustment means comprise a first insert removably engageable inside the inlet chamber and carrying a first through hole for a transit of the infusion fluid, said first through hole being occluded by the shutter in the closing configuration and being defined by a first hole diameter suitable for allowing the flow of the infusion fluid to lift the shutter and move the shutter from the closing configuration to the intermediate opening configuration.

14. The machine of claim 13, wherein the inlet chamber comprises an access opening facing an outside of the valve body and suitable for allowing an axial position of the first insert to be adjusted along the inlet chamber and/or the first insert to be replaced without disassembling the flow adjustment solenoid valve.

15. The machine of claim 14, wherein the flow adjustment solenoid valve comprises a cap for removably closing the access opening.

16. The machine of claim 4, wherein the inlet chamber is defined by a first pipe extending along a fluid inlet axis, and by a second pipe extending along the valve axis incident to the fluid inlet axis, wherein the first pipe has an inlet mouth suitable for receiving the infusion fluid pumped by the pump group, and a connection mouth for connection with the second pipe, and wherein the second pipe extends between a first end and a second end opposite to the first end, wherein said second end has an opening facing the flow adjustment chamber and suitable for being blocked by the shutter in the closing configuration.

17. The machine of claim 16, wherein the flow adjustment means comprise a first insert removably engageable inside the inlet chamber and carrying a first through hole for a transit of the infusion fluid, said first through hole being occluded by the shutter in the closing configuration and being defined by a first hole diameter suitable for allowing the flow of the infusion fluid to lift the shutter and move the shutter from the closing configuration to the intermediate opening configuration, wherein the inlet chamber comprises an access opening facing an outside of the valve body and suitable for allowing an axial position of the first insert to be adjusted along the inlet chamber and/or the first insert to be replaced without disassembling the flow adjustment solenoid valve, and wherein the access opening axially delimits the first end, and the first insert is positioned at the second end, in particular at the opening.

18. The machine of claim 16, wherein the flow adjustment means comprise a second insert removably engageable inside the inlet chamber so as to be replaceable without disassembling the flow adjustment solenoid valve, said second insert carrying a second through hole for a transit of the infusion fluid, wherein said second through hole is defined by a diameter that allows pressure and speed of the infusion fluid to be adjusted.

19. The machine of claim 18, wherein the second insert is arranged inside the first pipe close to the connection mouth.

20. The machine of claim 16, wherein the valve axis is orthogonal to the fluid inlet axis so as to form a T- or L-shaped inlet chamber.

* * * * *